US012296441B2

(12) United States Patent
Lindström

(10) Patent No.: US 12,296,441 B2
(45) Date of Patent: May 13, 2025

(54) ARRANGEMENT FOR POWER TOOL, TOOL HEAD, POWER TOOL, AND METHOD OF CONTROLLING ARRANGEMENT

(71) Applicant: ATLAS COPCO INDUSTRIAL TECHNIQUE AB, Stockholm (SE)

(72) Inventor: Jakob Lindström, Enskede (SE)

(73) Assignee: ATLAS COPCO INDUSTRIAL TECHNIQUE AB, Stockholm (SE)

(*) Notice: Subject to any disclaimer, the term of this patent is extended or adjusted under 35 U.S.C. 154(b) by 0 days.

(21) Appl. No.: 18/702,084

(22) PCT Filed: Sep. 13, 2022

(86) PCT No.: PCT/EP2022/075407
§ 371 (c)(1),
(2) Date: Apr. 17, 2024

(87) PCT Pub. No.: WO2023/066569
PCT Pub. Date: Apr. 27, 2023

(65) Prior Publication Data

US 2024/0326201 A1 Oct. 3, 2024

(30) Foreign Application Priority Data

Oct. 22, 2021 (SE) .................................... 2130285-6

(51) Int. Cl.
*B25B 13/46* (2006.01)
*B25B 21/00* (2006.01)
(Continued)

(52) U.S. Cl.
CPC ............ *B25B 21/004* (2013.01); *B25F 5/001* (2013.01); *B25B 23/0021* (2013.01)

(58) Field of Classification Search
CPC ...... B25B 21/00; B25B 21/002; B25B 13/463
(Continued)

(56) References Cited

U.S. PATENT DOCUMENTS 3,535,960 A * 10/1970 Borries ................. B25B 21/002 81/57.14
4,064,772 A * 12/1977 Boyd .................... B25B 21/002 81/57.13
(Continued)

FOREIGN PATENT DOCUMENTS

CN 110919581 A 3/2020
DE 2016352 A1 10/1971
(Continued)

OTHER PUBLICATIONS

Atlas Copco Industrial Technique AB, International Patent Application No. PCT/EP2022/075407, International Search Report, Jan. 3, 2023.

(Continued)

*Primary Examiner* — Thanh K Truong
*Assistant Examiner* — Patrick B Fry
(74) *Attorney, Agent, or Firm* — Moore & Van Allen PLLC; W. Kevin Ransom

(57) ABSTRACT

An arrangement for a power tool, the arrangement comprising a base structure; a drive member rotatable from a neutral position; a stopping device comprising a movable element and a limiting element; wherein the stopping device is arranged to adopt a first state where the stopping device allows rotation of the drive member in a first direction and generates a first counter torque; wherein the stopping device is arranged to adopt a second state where the stopping device allows rotation of the drive member in a second direction and provides a second counter torque; and wherein the stopping device is deflectable to switch from the first state to the second state by rotating the drive member in the second direction from the neutral position with a second switching torque overcoming the first counter torque.

16 Claims, 9 Drawing Sheets

(51) Int. Cl.
*B25B 23/00* (2006.01)
*B25F 5/00* (2006.01)

(58) Field of Classification Search
USPC .................................... 81/58.2, 57.13, 57.29
See application file for complete search history.

(56) References Cited

U.S. PATENT DOCUMENTS

| | | | | | |
|---|---|---|---|---|---|
| 4,287,795 | A | | 9/1981 | Curtiss | |
| 5,355,751 | A | * | 10/1994 | Specht | B25B 23/147 81/57.3 |
| 5,522,285 | A | * | 6/1996 | Wilson, Jr. | B25B 17/00 81/57.3 |
| 5,636,698 | A | * | 6/1997 | Estep | B25B 21/002 173/217 |
| 6,035,745 | A | | 3/2000 | Kather | |
| 6,559,613 | B1 | * | 5/2003 | Elliott | B25B 21/002 318/434 |
| 8,297,373 | B2 | * | 10/2012 | Elger | B25C 5/15 173/100 |
| 9,126,317 | B2 | * | 9/2015 | Lawton | G06Q 10/20 |
| 9,381,625 | B2 | * | 7/2016 | Chen | B25B 21/00 |
| 11,712,787 | B2 | * | 8/2023 | Nick | B25B 21/004 81/57.11 |
| 2004/0177978 | A1 | | 9/2004 | Cobzaru et al. | |
| 2014/0182420 | A1 | | 7/2014 | Chen et al. | |
| 2019/0176303 | A1 | | 6/2019 | Scott et al. | |

FOREIGN PATENT DOCUMENTS

| | | | | | |
|---|---|---|---|---|---|
| JP | H0768473 | A | * | 3/1995 | B25B 13/48 |
| WO | 2007058321 | A1 | | 5/2007 | |

OTHER PUBLICATIONS

Atlas Copco Industrial Technique AB, International Patent Application No. PCT/EP2022/075407, Written Opinion, Jan. 3, 2023.

Atlas Copco Industrial Technique AB, Swedish Patent Application No. 2130285-6, Office Action, May 25, 2022.

* cited by examiner

ARRANGEMENT FOR POWER TOOL, TOOL HEAD, POWER TOOL, AND METHOD OF CONTROLLING ARRANGEMENT

CROSS-REFERENCE TO RELATED APPLICATIONS

This application is a National Stage Patent Application (filed under 35 § U.S.C. 371) of PCT/EP2022/075407, filed Sep. 13, 2022 of the same title, which, in turn claims priority to Swedish Patent Application No. 2130285-6 filed Oct. 22, 2021 of the same title; the contents of each of which are hereby incorporated by reference.

TECHNICAL FIELD

The present disclosure generally relates to an arrangement for power tools. In particular, an arrangement for a power tool, a tool head for a power tool, a power tool, and a method of controlling an arrangement for a power tool, are provided.

BACKGROUND

An open end power tool may comprise a driven member rotatable about a driven axis and having a driven member opening for receiving a nut, or a shaft around which the nut is threaded, therethrough in a radial direction with respect to the driven axis. In order to position the driven member in an open position where the nut or the shaft can be radially received through the driven member opening, the power tool may comprise a mechanical stop, such as a protrusion. By driving the driven member in a first direction, the nut can be tightened. By driving the driven member in a second direction, opposite to the first direction, the driven member can be driven against the mechanical stop to ensure that the driven member is positioned in the open position. Such power tools have a disadvantage in that the driven member can only be used to rotate the nut in one direction.

In order to overcome the above disadvantage, some open end power tools comprise a sensor for detecting when the driven member is positioned in the open position. Such power tools do not need the mechanical stop and the driven member can therefore be driven to rotate the nut in both directions. However, such sensor adds costs and complexity to the power tool. For example, the sensor needs associated cabling.

SUMMARY

One object of the present disclosure is to provide an arrangement for a power tool, which arrangement enables dual direction rotation of a drive member and positioning of the drive member in a neutral position.

A further object of the present disclosure is to provide an arrangement for a power tool, which arrangement has a less complicated design.

A still further object of the present disclosure is to provide an arrangement for a power tool, which arrangement has a cost-efficient design.

A still further object of the present disclosure is to provide an arrangement for a power tool, which arrangement has an improved performance.

A still further object of the present disclosure is to provide an arrangement for a power tool, which arrangement reduces storage requirements.

A still further object of the present disclosure is to provide an arrangement for a power tool, which arrangement solves several or all of the foregoing objects in combination.

A still further object of the present disclosure is to provide a tool head for a power tool, which tool head solves one, several or all of the foregoing objects.

A still further object of the present disclosure is to provide a power tool comprising a tool head, which power tool solves one, several or all of the foregoing objects.

A still further object of the present disclosure is to provide a method of controlling an arrangement for a power tool, which method solves one, several or all of the foregoing objects.

According to a first aspect, there is provided an arrangement for a power tool, the arrangement comprising a base structure; a drive member rotatable relative to the base structure in a first direction and in a second direction from a neutral position; a stopping device comprising a movable element and a limiting element; wherein the stopping device is arranged to adopt a first state where the movable element is in a first region with respect to the limiting element, and where the stopping device allows rotation of the drive member in the first direction and generates a first counter torque against rotation of the drive member in the second direction from the neutral position; wherein the stopping device is arranged to adopt a second state where the movable element is in a second region with respect to the limiting element, and where the stopping device allows rotation of the drive member in the second direction and provides a second counter torque against rotation of the drive member in the first direction from the neutral position; and wherein the stopping device is deflectable to switch from the first state to the second state by rotating the drive member in the second direction from the neutral position with a second switching torque overcoming the first counter torque.

When the stopping device deflects to switch from the first state to the second state, the movable element flips between the first and second regions, e.g. from a first side to a second side of the limiting element. The stopping device provides a second torque peak that the second switching torque needs to overcome in order to switch the stopping device from the first state to the second state. The stopping device may further be deflectable to switch from the second state back to the first state by rotating the drive member in the first direction from the neutral position with a first switching torque overcoming the second counter torque. The stopping device thereby provides a first torque peak that the first switching torque needs to overcome in order to switch the stopping device from the second state back to the first state. An absolute value of the first switching torque may or may not be equal to an absolute value of the second switching torque.

The first counter torque may be generated by the limiting element limiting movement of the moveable element from the first region to the second region.

The second counter torque may be generated by the limiting element limiting movement of the moveable element from the second region to the first region.

In other words, the limiting element may be arranged to restrict the movement of the movable element from the first region to the second region and vice versa. The limiting element and the movable element may further be arranged such that the restriction may be overcome when the second switching torque overcoming the first counter torque (or a first switching torque overcoming the second counter torque) is applied to the drive member, whereby the movable element is forced to pass from the first region to the second region (or vice versa). This can be accomplished in several different ways, as will be described later on in the present specification.

Throughout the present disclosure, the power tool may be an open end power tool. Such power tool may comprise a driven axis; a base element having a base opening; a driven member having a driven member opening, the driven member being rotatable about the driven axis from an open position where the driven member opening is aligned with the base opening; and a drive transmission arranged to transmit a rotation of the drive member to a rotation of the driven member. When the drive transmission is configured such that the neutral position of the drive member corresponds to the open position of the driven member, the arrangement enables accurate positioning of the driven member in the open position without using sensors and dual directional rotation of the driven member over several full turns.

When the stopping device adopts the first state, the drive member can be rotated continuously with a plurality of full rotations in the first direction, e.g. for driving the driven member to rotate a nut in a clockwise direction. By rotating the drive member in the second direction with a second drive torque when the stopping device adopts the first state, the drive member will eventually be stopped by the stopping device in the neutral position corresponding to the open position of the driven member. By applying the second switching torque to the drive member, larger than the second drive torque, the movable element is forced by the drive member to cause deflection of the stopping device such that the movable element moves from the first region to the second region. The stopping device is thereby switched from the first state to the second state.

When the stopping device adopts the second state, the drive member can be rotated continuously with a plurality of full rotations in the second direction, e.g. for driving the driven member to rotate the nut in a counterclockwise direction. By rotating the drive member in the first direction with a first drive torque when the stopping device adopts the second state, the drive member will eventually be stopped by the stopping device in the neutral position. By applying the first switching torque to the drive member, larger than the first drive torque, the movable element is forced by the drive member to cause deflection of the stopping device such that the movable element moves from the second region back to the first region. The stopping device is thereby switched from the second state back to the first state.

The arrangement thus enables the driven member to do both tightening and loosening of the nut without needing a sensor for determining a position of the drive member and/or the driven member. Correspondingly, the arrangement also enables the driven member to do both clockwise and counterclockwise tightening of the nut.

Due to the functionality of the arrangement, there is no need to produce two different arrangements, one for clockwise tightening and one for counterclockwise tightening. The arrangement therefore enables fewer variants of the arrangement to be manufactured and held in stock.

The movable element may be a free body with respect to the base structure, the drive member and the remainder of the stopping device. The movable element may be movable relative to the limiting element. Alternatively, the movable element may be connected to the limiting element or to another part of the arrangement.

The drive member may be rotatable about a drive axis. Each of the first and second directions may be rotational directions about the drive axis and the second direction may be opposite to the first direction.

The drive member may be concentric with the drive axis. The drive axis may be parallel with the driven axis. The stopping device except the movable element may be symmetric with respect to a plane comprising the drive axis.

The base structure may be fixed with respect to a main body of the power tool. Thus, in case the power tool is held stationary, also the base structure is stationary. For this reason, the base structure may be referred to as a stationary structure.

The base structure, the drive member and the stopping device may lie in a common plane transverse to the drive axis. The base structure may fully or at least partly surround the drive member, e.g. by enclosing at least 180 degrees of the drive member (with respect to the drive axis). The stopping device may be positioned between the base structure and the drive member.

The arrangement may further comprise a constriction between the limiting element and the drive member. In this case, the movable element is positioned on a first side of the constriction in the first state and on a second side of the constriction in the second state. The movable element may be arranged to be stopped by the constriction when the second drive torque is applied to the drive member in the first state. When the second switching torque is applied to the drive member in the first state, the movable element passes through the constriction. The movable element may be arranged to be stopped by the constriction when the first drive torque is applied to the drive member in the second state. When the first switching torque is applied to the drive member in the second state, the movable element passes through the constriction.

The constriction may alternatively be referred to as a narrowing. The constriction may be configured to be widened by the deflection of the stopping device.

The stopping device may comprise at least one elastic element. In this case, the stopping device may be configured to deflect by deformation of the at least one elastic element when the stopping device switches from the first state to the second state and/or from the second state to the first state. When the elastic element deforms, the moveable element can pass the limiting element and move from the first to second region and vice versa. The at least one elastic element may comprise a stopping spring, such as a blade spring or a coil spring, of the limiting element. Alternatively, or in addition, the movable element may be elastic and thereby constitute one elastic element of the at least one elastic element. One or more of the at least one elastic element may also optionally be constituted by an elastic part of the base structure.

The base structure may comprise a first chamber for receiving the movable element in the first state and a second chamber for receiving the movable element in the second state. In this case, the limiting element may be arranged between the first chamber and the second chamber. When the stopping device adopts the first state and the drive member rotates in the first direction, the drive member pushes the movable element into the first chamber. Conversely, when the stopping device adopts the second state and the drive member rotates in the second direction, the drive member pushes the movable element into the second chamber.

The stopping device may comprise a first force device associated with the first chamber and arranged to force the movable element towards the drive member in the first state, and a second force device associated with the second chamber and arranged to force the movable element towards the drive member in the second state.

The first force device may be positioned in the first chamber and the second force device may be positioned in the second chamber. Each of the force device may be a magnet or a spring, such as a compression coil spring, a blade spring, or a leg of a blade spring. As a possible alternative, one or each of the first and second force devices may be omitted and the movable element can be forced towards the drive member by means of gravity.

The drive member may comprise an engaging structure arranged to engage the movable element in the neutral position in each of the first state and the second state. Thus, regardless of whether the stopping device is in the first or second state, the engaging structure can force the movable element against the limiting element when the drive member adopts the neutral position.

The engaging structure may comprise a recess. A width of the recess in a circumferential direction with respect to the drive axis may be at least 1.5 times, such as twice, a width of the movable element in the circumferential direction. Alternatively, or in addition, the engaging structure may comprise one or more protrusions. One example of such protrusion is a wedge.

The movable element may comprise a ball. The ball may be rigid, for example by being made of metal or hard plastic. Alternatively, the ball may be elastic and hence be used as an elastic element of the stopping device. In any case, the ball may be spherical.

According to a second aspect, there is provided a tool head for a power tool, the tool head comprising the arrangement according to the first aspect. The tool head may be detachably attachable to a main body of the power tool.

The tool head may further comprise a driven axis; a base element having a base opening; a driven member having a driven member opening, the driven member being rotatable about the driven axis from an open position where the driven member opening is aligned with the base opening; and a drive transmission arranged to transmit a rotation of the drive member to a rotation of the driven member; wherein the drive transmission is configured such that the neutral position of the drive member corresponds to the open position of the driven member.

According to a third aspect, there is provided a power tool comprising the tool head according to the second aspect. The power tool may be an open end power tool as described herein. The power tool may for example be an electric, hydraulic or pneumatic power tool. Alternatively, or in addition, the power tool may be a tightening tool, e.g. for tightening a nut on a threaded member. Alternatively, or in addition, the power tool may be handheld.

The power tool may further comprise a control system, the control system comprising at least one data processing device and at least one memory having at least one computer program stored thereon, the at least one computer program comprising program code which, when executed by the at least one data processing device, causes the at least one data processing device to perform the steps of commanding the drive member to generate a second drive torque in the second direction against the stopping device in the neutral position of the drive member when the stopping device adopts the first state; commanding the second drive torque to increase to a second switching torque where the stopping device switches from the first state to the second state; and storing a second threshold value indicative of the second switching torque.

The at least one computer program may further comprise program code which, when executed by the at least one data processing device, causes the at least one data processing device to perform the steps of commanding the drive member to generate a first drive torque in the first direction against the stopping device in the neutral position of the drive member when the stopping device adopts the second state; commanding the first drive torque to increase to a first switching torque where the stopping device switches from the second state to the first state; and storing a first threshold value indicative of the first switching torque.

In order to cause the drive member to generate the second drive torque, the drive member may be controlled to rotate at a target rotational speed. Once the drive member is stopped by the stopping device in the neutral position, the second drive torque will increase and the driving of the drive member can then be stopped, e.g. when the second drive torque reaches the first counter torque (or a torque value slightly below the first counter torque). In order to switch the stopping device from the first state to the second state, the torque on the drive member is allowed to increase to the second switching torque without stopping the drive member. The foregoing applies vice versa for the first drive torque and the first switching torque to switch from the second state to the first state.

Thus, the control system may be configured to carry out a tuning process where information regarding drive torques for overcoming friction and other forces to drive the drive member to the neutral position without causing switching, and regarding switching torques for switching the stopping device between the first and second states, can be stored and subsequently used. The control system thereby knows which drive torques can be used without switching, and which switching torque is required for switching to each of the first and second states. The tuning process may be performed automatically, for example at predefined intervals. Alternatively, or in addition, threshold values indicative of the switching torques may be stored each time the stopping device switches between the first and second states.

The control system according to this aspect enables efficient updating of the switching torques. The arrangement can thereby efficiently compensate for changed characteristics of the arrangement (e.g. due to wear) and can reliably ensure that no inadvertent switching between the first and second states takes place. The control system may be physically located in a main body of the power tool.

The power tool may further comprise a state selection element for alternatingly selecting between the first state and the second state; and a driving command element for alternatingly commanding rotation of the drive member in the first direction and in the second direction. When the stopping device adopts the first state and the driving command element is actuated a first time (for example pushed a first time), the drive member rotates in the first direction. When the driving command element is actuated a second time (for example pushed a second time), the drive member rotates in the second direction and stops in the neutral position. By actuating the state selection element, the drive member is driven to switch the stopping device from the first state to the second state. The driving command element can now be actuated a first time and a second time to cause driving of the drive member in the second direction and in the first direction back to the neutral position, respectively.

According to a fourth aspect, there is provided a method of controlling an arrangement for a power tool, where the arrangement comprises a base structure; a drive member rotatable relative to the base structure in a first direction and in a second direction from a neutral position; a stopping device comprising a movable element and a limiting element; wherein the stopping device is arranged to adopt a first state where the movable element is in a first region with respect to the limiting element, and where the stopping device allows rotation of the drive member in the first direction and generates a first counter torque against rotation of the drive member in the second direction from the neutral position; wherein the stopping device is arranged to adopt a second state where the movable element is in a second region with respect to the limiting element, and where the stopping device allows rotation of the drive member in the second direction and provides a second counter torque against rotation of the drive member in the first direction from the neutral position; and wherein the stopping device is deflectable to switch from the first state to the second state by rotating the drive member in the second direction from the neutral position with a second switching torque overcoming the first counter torque; the method comprising commanding the drive member to generate a second drive torque in the second direction against the stopping device in the neutral position of the drive member when the stopping device adopts the first state; commanding the second drive torque to increase to the second switching torque where the stopping device switches from the first state to the second state; and storing a second threshold value indicative of the second switching torque. The method may further comprise commanding the drive member to generate a first drive torque in the first direction against the stopping device in the neutral position of the drive member when the stopping device adopts the second state; commanding the first drive torque to increase to a first switching torque where the stopping device switches from the second state to the first state; and storing a first threshold value indicative of the first switching torque. The arrangement in the method of the fourth aspect may be of any type according to the first aspect.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1A:
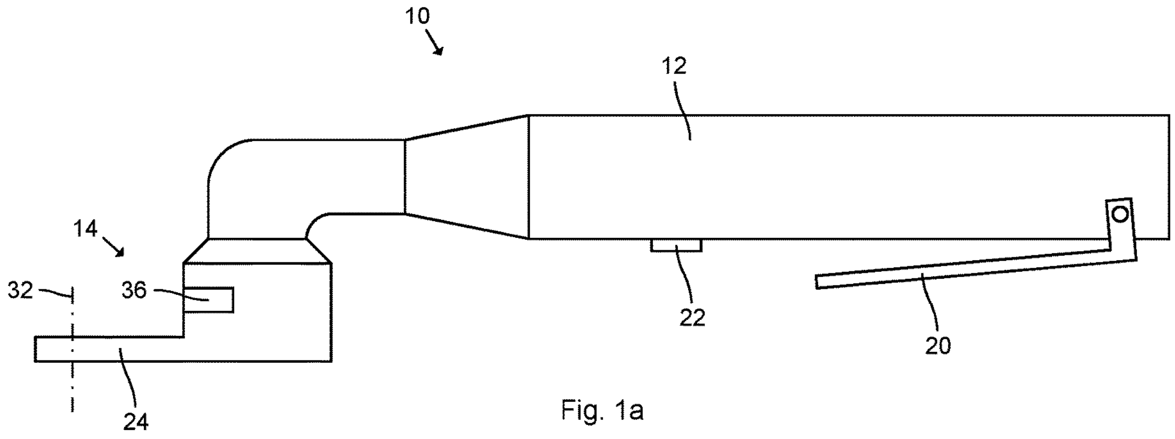
FIG. 1*a*: schematically represents a side view of a power tool comprising a main body and a tool head comprising an arrangement.

In the following, an arrangement for a power tool, a tool head for a power tool, a power tool, and a method of controlling an arrangement for a power tool, will be described. The same or similar reference numerals will be used to denote the same or similar structural features.

Figure 1B:
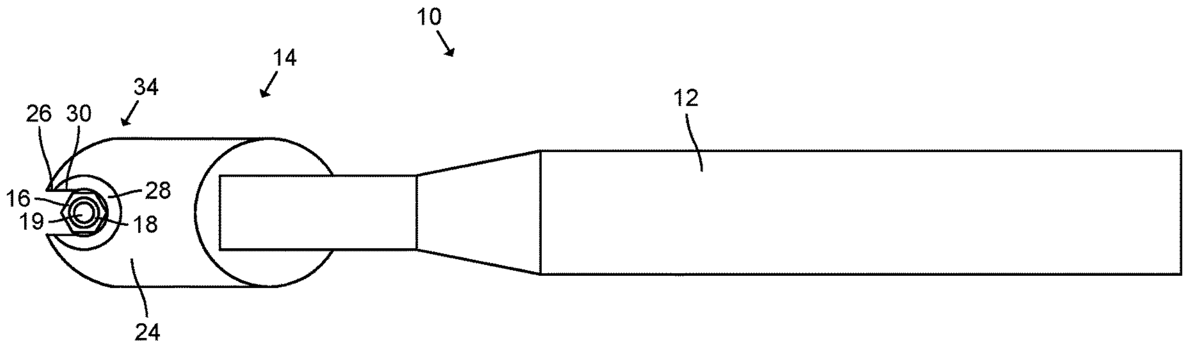
FIG. 1*b*: schematically represents a top view of the power tool.

FIG. 1*a* schematically represents a side view of a power tool 10, and FIG. 1*b* schematically represents a top view of the power tool 10. With collective reference to FIGS. 1*a* and 1*b*, the power tool 10 comprises a main body 12 and a tool head 14. The tool head 14 is detachably attached to the main body 12.

The power tool 10 of this example is a handheld open end power tool for tightening. The power tool 10 may for example be driven electrically. As shown in FIG. 1*b*, the power tool 10 can for example be used to tighten or loose a nut 16 threaded on a threaded coupling 18. The threaded coupling 18 may in turn enclose a pipe 19.

The power tool 10 of this example further comprises a driving command element 20 and a state selection element 22 arranged at the main body 12. The driving command element 20 is here exemplified as a lever rotatable relative to the main body 12. The state selection element 22 is here exemplified as a button.

The tool head 14 comprises a base element 24. The base element 24 comprises a base opening 26 at a distal end thereof.

The tool head 14 further comprises a driven member 28 having a driven member opening 30. The driven member 28 is rotatable relative to the base element 24 about a driven axis 32. In FIGS. 1*a* and 1*b*, the driven member 28 is in an open position 34. In the open position 34, the driven member opening 30 is aligned with the base opening 26 and can thereby receive the nut 16 in a radial direction with respect to the driven axis 32. Alternatively, the pipe 19 may be received through the driven member opening 30 in the open position 34, and the power tool 10 may then be moved axially along the pipe 19 to axially receive the nut 16 in the driven member opening 30.

The tool head 14 further comprises an arrangement 36. By means of the arrangement 36, the driven member 28 can rotate clockwise about the driven axis 32, rotate counter-clockwise about the driven axis 32, and can be positioned in the open position 34 from each of the clockwise direction and the counterclockwise direction.

In this implementation, a first push of the driving command element 20 causes clockwise rotation of the driven member 28, and a second push of the driving command element 20 causes counterclockwise rotation of the driven member 28 back to the open position 34. A push on the state selection element 22 causes a switch such that a subsequent first push of the driving command element 20 causes counterclockwise rotation of the driven member 28, and a subsequent second push of the driving command element 20 causes clockwise rotation of the driven member 28 back to the open position 34.

Figure 2:
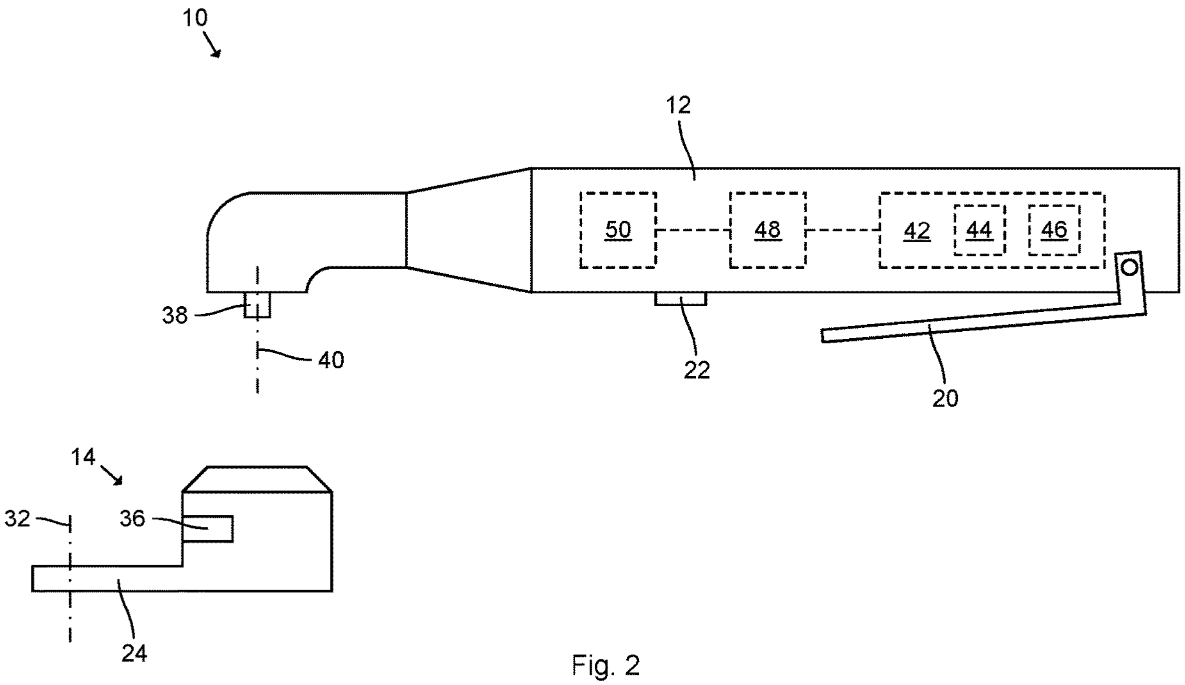
FIG. 2: schematically represents a side view of the power tool when the tool head is detached from the main body.

FIG. 2 schematically represents a side view of the power tool 10 when the tool head 14 is detached from the main body 12. As shown in FIG. 2, the main body 12 of this example comprises a drive shaft 38. The drive shaft 38 is rotatable about a drive axis 40. In this example, the drive axis 40 is parallel with the driven axis 32 when the tool head 14 is attached to the main body 12.

The power tool 10 of this example further comprises a control system 42. The control system 42 is here provided in the main body 12. The control system 42 comprises a data processing device 44 and a memory 46. The memory 46 has a computer program stored thereon. The computer program comprises program code which, when executed by the data processing device 44, causes the data processing device 44 to perform, or command performance of, various steps as described herein.

The main body 12 further comprises a motor 48 and a motor transmission 50. The motor transmission 50 is configured to transmit a rotation of the motor 48 to a rotation of the drive shaft 38 in a manner previously known as such. The control system 42 is in signal communication with the motor 48. The control system 42 is configured to control a rotational direction and a torque of the drive shaft 38.

Figure 3A:
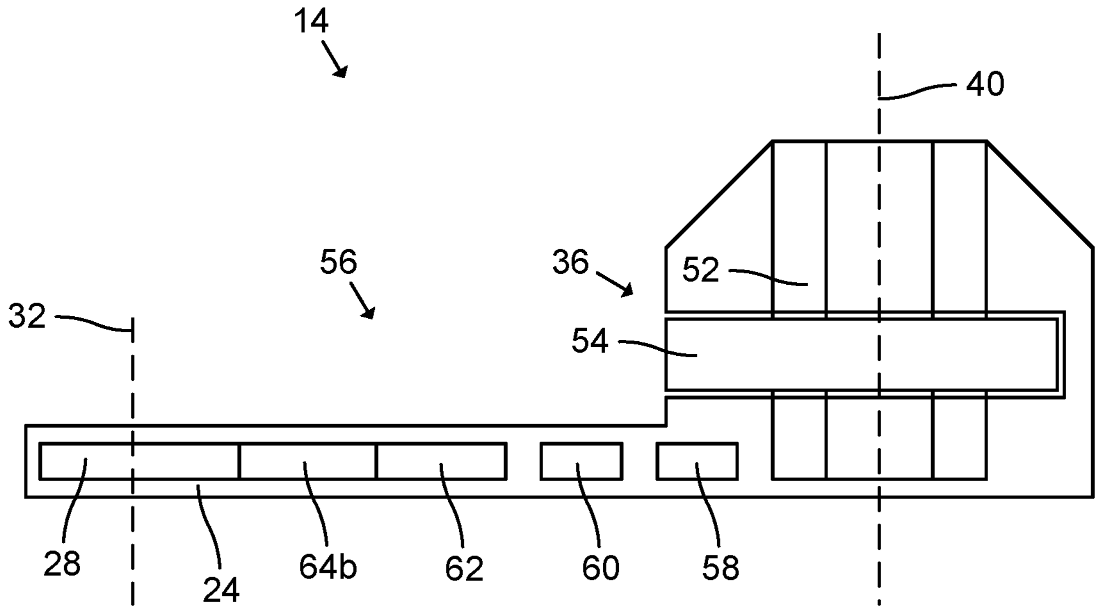
FIG. 3*a*: schematically represents a cross-sectional side view of the tool head.
Figure 3B:
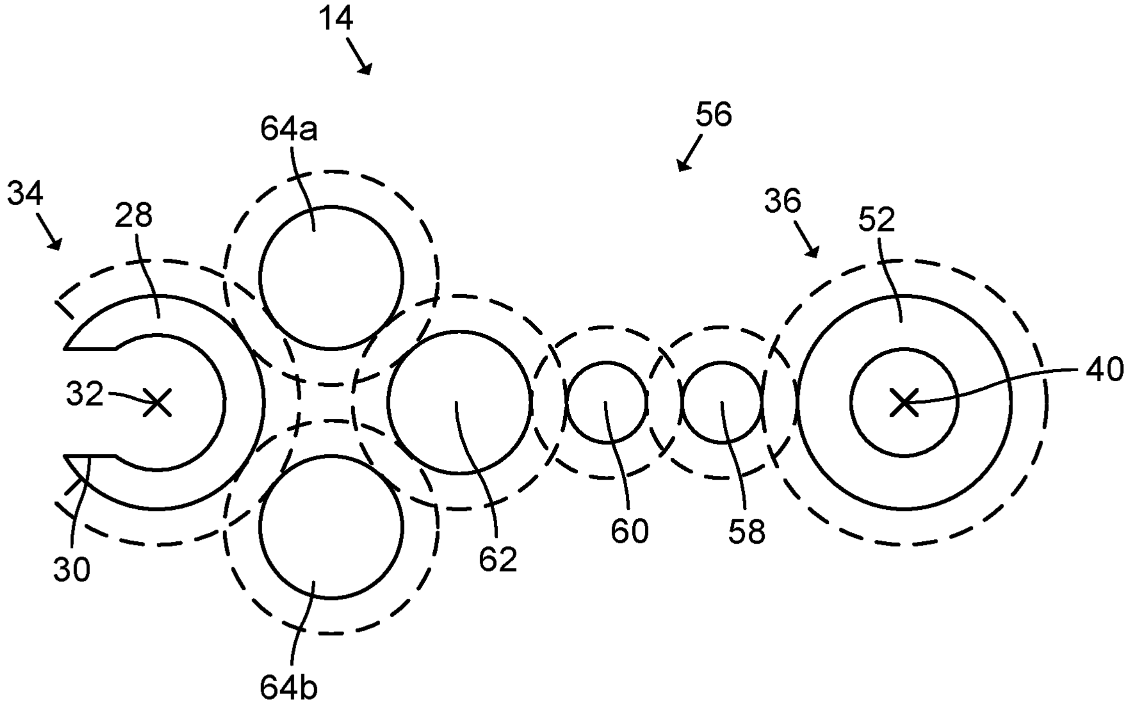
FIG. 3*b*: schematically represents a top view of components of the tool head.

FIG. 3*a* schematically represents a cross-sectional side view of the tool head 14, and FIG. 3*b* schematically represents a top view of components of the tool head 14. With collective reference to FIGS. 3*a* and 3*b*, the arrangement 36 comprises a drive member 52. The drive member 52 is rotatable about the drive axis 40 relative to the base element 24. The drive member 52 is here exemplified as a hollow shaft arranged to receive the drive shaft 38 for being driven thereby.

The arrangement 36 further comprises a base structure 54. The base structure 54 is fixed to the base element 24.

The tool head 14 further comprises a drive transmission 56. The drive transmission 56 is configured to transmit a rotation of the drive member 52 about the drive axis 40 to a rotation of the driven member 28 about the driven axis 32. In this example, the ratio between the drive member 52 and the driven member 28 is 1:1. The drive transmission 56 of this specific example comprises a first gear wheel 58 in meshing engagement with a toothed portion of the drive member 52, a second gear wheel 60 in meshing engagement with the first gear wheel 58, a third gear wheel 62 in meshing engagement with the second gear wheel 60, a primary fourth gear wheel 64*a* in meshing engagement with each of the third gear wheel 62 and a toothed portion of the driven member 28, and a secondary fourth gear wheel 64*b* in meshing engagement with each of the third gear wheel 62 and the toothed portion of the driven member 28.

Figure 4A:
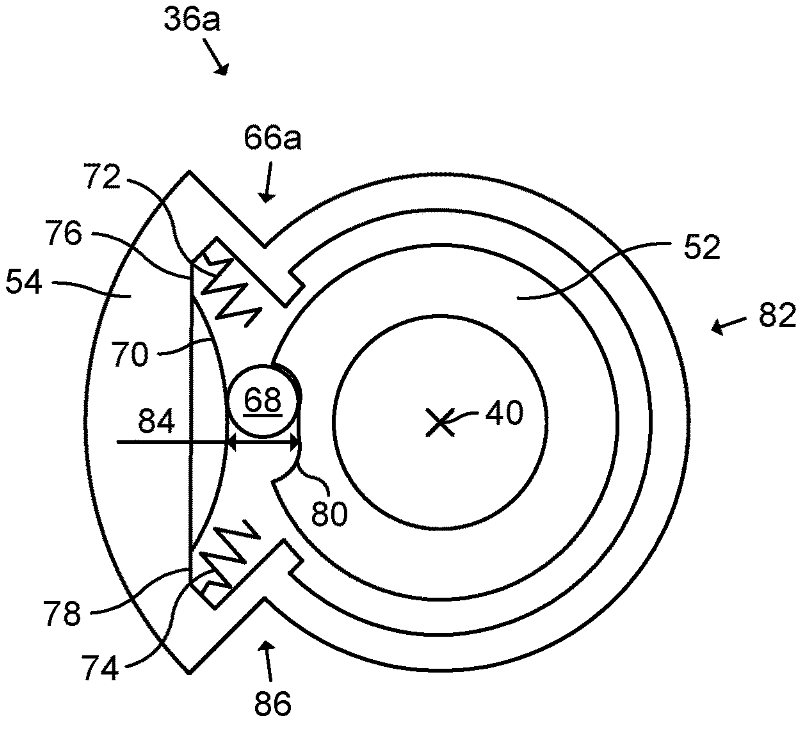
FIG. 4*a*: schematically represents a top view of one example of the arrangement when a stopping device is in a first state and a drive member is in a neutral position.

FIG. 4*a* schematically represents a top view of one example of an arrangement 36*a*. The arrangement 36*a* may be used as the arrangement 36 in the power tool 10. In addition to the drive member 52 and the base structure 54, the arrangement 36*a* further comprises a stopping device 66*a*. The stopping device 66*a* is positioned between the drive member 52 and the base structure 54. The stopping device 66*a* comprises a ball 68, here exemplified as a spherical rigid metal ball. The ball 68 is one example of a movable element according to the present disclosure.

The stopping device 66*a* further comprises a stopping spring 70, here exemplified as a blade spring. The stopping spring 70 is one example of a limiting element according to the present disclosure. The stopping spring 70 is also one example of an elastic element according to the present disclosure.

The stopping device 66*a* of this specific example further comprises a first spring 72 and a second spring 74, here exemplified as compression coil springs. The first and second springs 72 and 74 are examples of first and second force devices, respectively, according to the present disclosure.

The base structure 54 comprises a first chamber 76 and a second chamber 78. In this example, the first spring 72 is seated in a bottom of the first chamber 76 and the second spring 74 is seated in a bottom of the second chamber 78. The stopping spring 70 is positioned generally between the first and second springs 72 and 74. The base structure 54 of this specific completely surrounds the drive member 52.

The drive member 52 of this example comprises a recess 80. The recess 80 is one example of an engaging structure according to the present disclosure. The recess 80 has a depth substantially corresponding to half a diameter of the ball 68. The recess 80 has a width in a circumferential direction with respect to the drive axis 40 that is approximately twice the diameter of the ball 68.

In FIG. 4*a*, the drive member 52 is in a neutral position 82. The drive transmission 56 is configured such that the neutral position 82 of the drive member 52 corresponds to the open position 34 of the driven member 28.

FIG. 4*a* further shows that the stopping device 66*a* comprises a constriction 84 between the stopping spring 70 and the drive member 52, here the recess 80 of the drive member 52. In FIG. 4*a*, the constriction 84 is slightly smaller than the diameter of the ball 68.

Furthermore, in FIG. 4*a*, the stopping device 66*a* is in a first state 86. In the first state 86, the ball 68 is positioned on a first side of the stopping spring 70 and the constriction 84 (the upper side in FIG. 4*a*). The first side is an example of a first region. In the neutral position 82 and the first state 86, the ball 68 is received in a first part of the recess 80 (upper part in FIG. 4*a*) and is in contact with the stopping spring 70. Furthermore, in the neutral position 82 and the first state 86, each of the stopping device 66*a* (except the ball 68), the drive member 52 and the base structure 54 is symmetric with respect to a central plane comprising the drive axis 40 (a horizontal plane through the drive axis 40 in FIG. 4*a*).

Figure 4B:
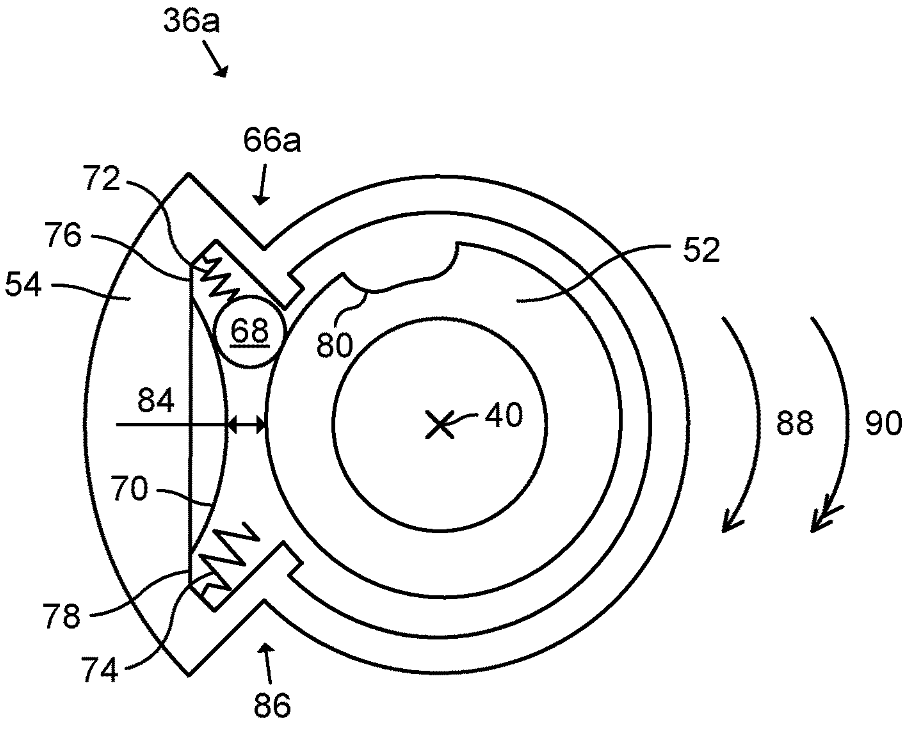
FIG. 4*b*: schematically represents a top view of the arrangement in FIG. 4*a* when a drive member rotates in a first direction.

FIG. 4*b* schematically represents a top view of the arrangement 36*a*. In FIG. 4*b*, the drive member 52 rotates about the drive axis 40 in a first direction 88 with a first drive torque 90, for example by pressing the driving command element 20 a first time. In the first state 86, the stopping device 66*a* allows rotation of the drive member 52 in the first direction 88.

As shown in FIG. 4*b*, the ball 68 is pushed into the first chamber 76 against deformation of the first spring 72 once the ball 68 leaves the recess 80. When the stopping device 66*a* is in the first state 86 and the drive member 52 rotates in the first direction 88, the drive member 52 and the stopping device 66*a* function as a freewheel. The drive member 52 can rotate continuously with several full turns in the first direction 88 to consequently cause the driven member 28 to rotate in a counterclockwise direction (as seen in FIG. 3*b*). Depending on the rotational speed, the ball 68 may be pushed into the recess 80 each time the recess 80 passes the first chamber 76. However, further rotation of the drive member 52 causes the ball 68 to again leave the recess 80. During rotation in the first direction 88, the stopping device 66*a* in the first state 86 only generates a very small counter torque. The tightening torque applied to the nut 16 is therefore at most fractionally affected.

Figure 4C:
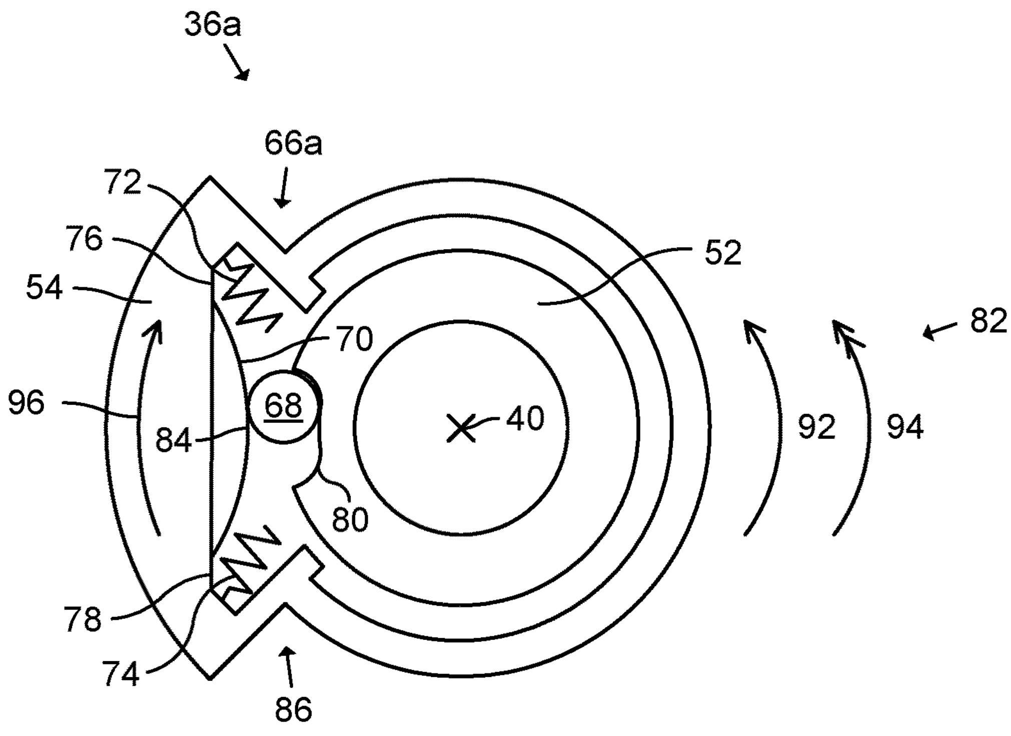
FIG. 4*c*: schematically represents a top view of the arrangement in FIGS. 4*a* and 4*b* when the drive member has rotated in a second direction back to the neutral position.

FIG. 4*c* schematically represents a top view of the arrangement 36*a*. In FIG. 4*c*, the drive member 52 has rotated about the drive axis 40 in a second direction 92 back to the neutral position 82 with a second drive torque 94, for example by pressing the driving command element 20 a second time. The stopping device 66*a* generates a relatively small first counter torque 96 against further rotation of the drive member 52 as the ball 68 is squeezed by the recess 80 against the stopping spring 70 when the second drive torque 94 is applied to the drive member 52. Thus, by rotating the drive member 52 in the second direction 92 with the second drive torque 94 when the stopping device 66*a* is in the first state 86, the drive member 52 is stopped in the neutral position 82 and the driven member 28 is consequently stopped in the open position 34.

Figure 4D:
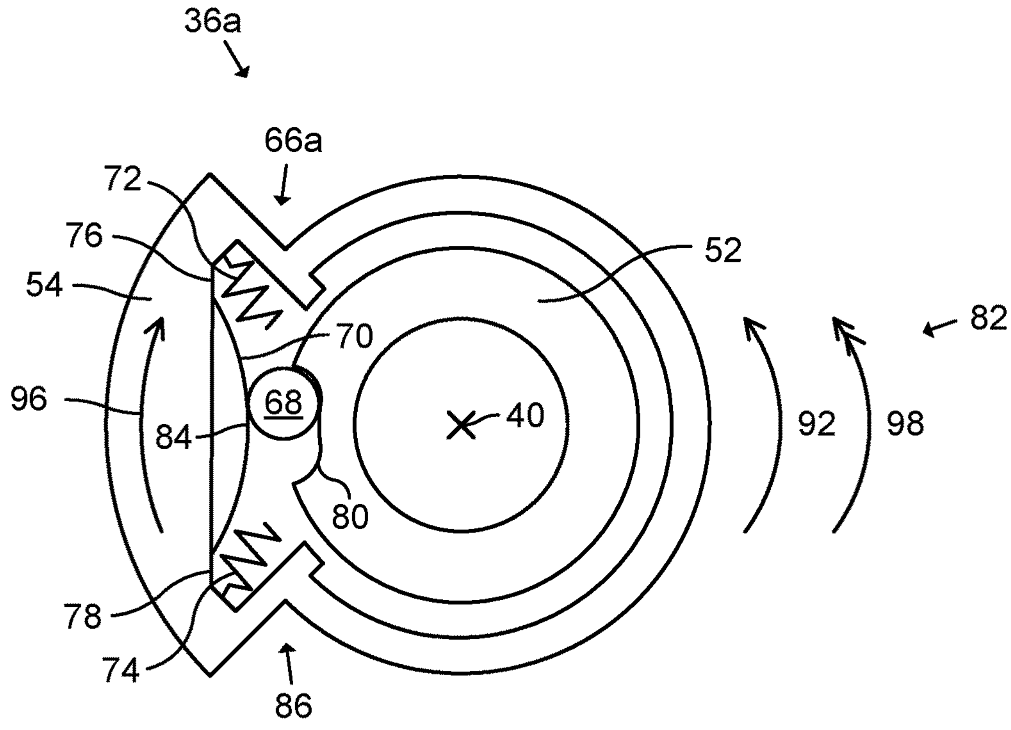
FIG. 4*d*: schematically represents a top view of the arrangement in FIGS. 4*a*-4*c* when the drive member is in the neutral position and a second switching torque is applied to the drive member.

FIG. 4*d* schematically represents a top view of the arrangement 36*a*. In FIG. 4*d*, the drive member 52 is in the neutral position 82. A second switching torque 98 is now applied to the drive member 52. The second switching torque 98 may be applied by pushing the state selection element 22. The second switching torque 98 is larger than the second drive torque 94. The second switching torque 98 will thereby cause the drive member 52 to push the ball 68 by means of the recess 80 against the stopping spring 70 such that the stopping spring 70 is enough deformed to cause the ball 68 to be pushed from the first side of the stopping spring 70, through the constriction 84 and to a second side of the stopping spring 70. The stopping device 66*a* thereby switches from the first state 86 to a second state. During this switching, the constriction 84 is temporarily widened due to the deformation of the stopping spring 70. The second side is one example of a second region.

Figure 4E:
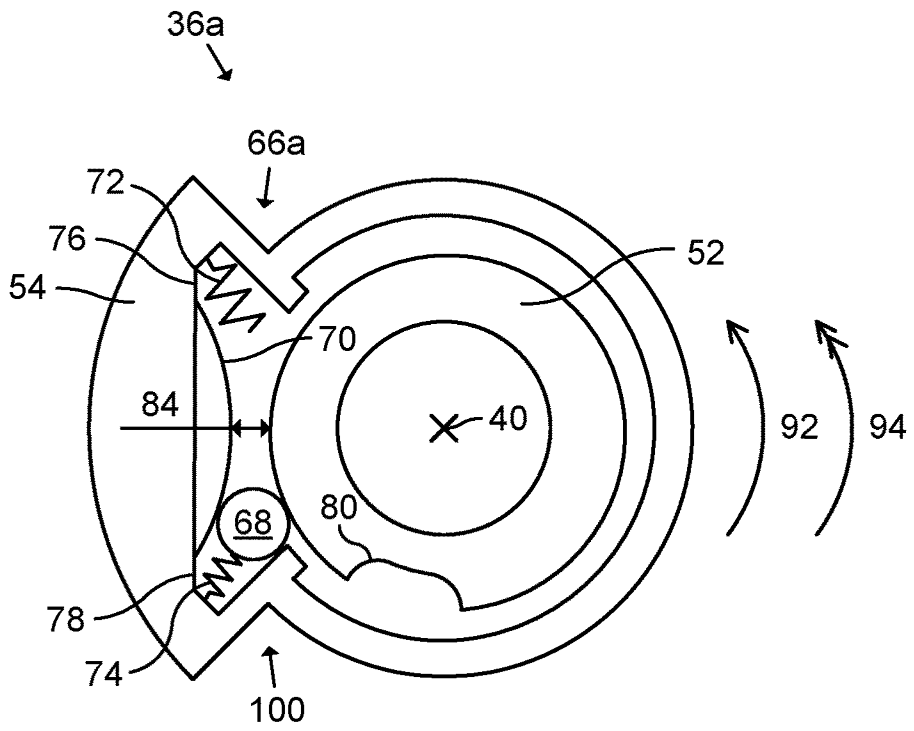
FIG. 4*e*: schematically represents a top view of the arrangement in FIGS. 4*a*-4*d* when the stopping device is in a second state and the drive member is rotated in the second direction.

FIG. 4*e* schematically represents a top view of the arrangement 36*a*. In FIG. 4*e*, the stopping device 66*a* is in the second state 100. The level of the second switching torque 98 when the ball 68 flips sides is stored as a second threshold value.

The drive member 52 rotates about the drive axis 40 in the second direction 92 with the second drive torque 94, for example by pressing the driving command element 20 a first time. In the second state 100, the stopping device 66*a* allows rotation of the drive member 52 in the second direction 92.

As shown in FIG. 4*e*, the ball 68 is now pushed into the second chamber 78 against deformation of the second spring 74 once the ball 68 leaves the recess 80. Also when the stopping device 66*a* is in the second state 100 and the drive member 52 rotates in the second direction 92, the drive member 52 and the stopping device 66*a* function as a freewheel. The drive member 52 can rotate continuously with several full turns in the second direction 92 to consequently cause the driven member 28 to rotate in a clockwise direction (as seen in FIG. 3*b*).

Figure 4F:
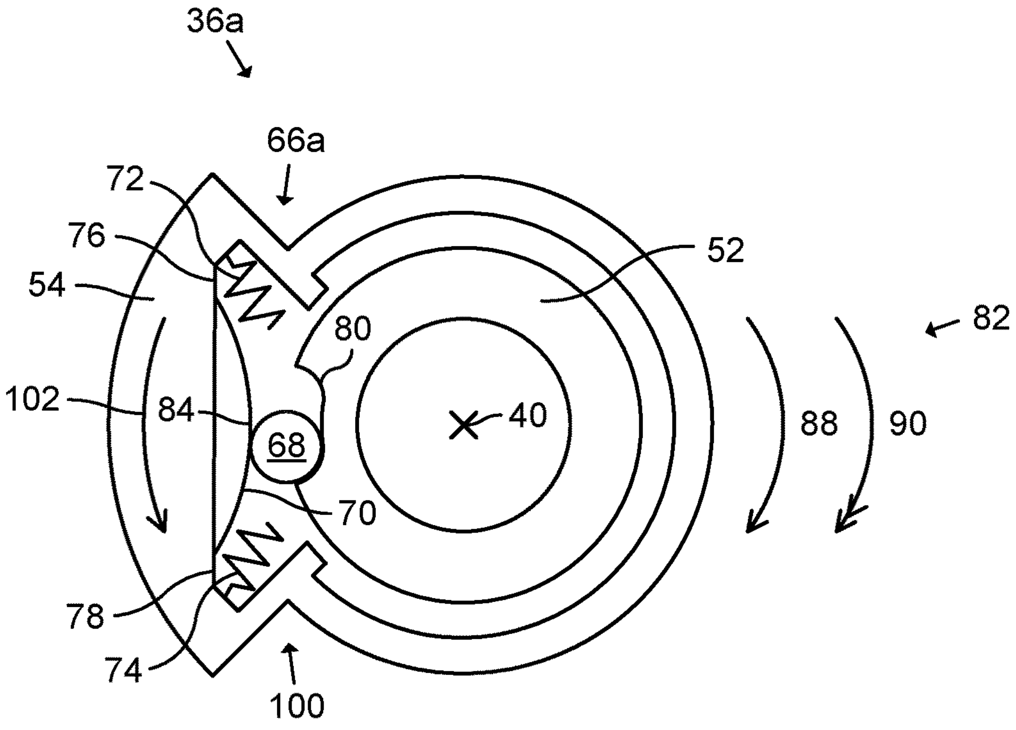
FIG. 4*f*: schematically represents a top view of the arrangement in FIGS. 4*a*-4*e* when the drive member has rotated in the first direction back to the neutral position.

FIG. 4*f* schematically represents a top view of the arrangement 36*a*. In FIG. 4*f*, the drive member 52 has rotated in the first direction 88 back to the neutral position 82 with the first drive torque 90, for example by pressing the driving command element 20 a second time. In the neutral position 82 and the second state 100, the ball 68 is received in a second part of the recess 80 (lower part in FIG. 4*a*) and is in contact with the stopping spring 70. The stopping device 66*a* generates a relatively small second counter torque 102 against further rotation of the drive member 52 as the ball 68 is squeezed by the recess 80 against the stopping spring 70 when the first drive torque 90 is applied to the drive member 52.

Thus, by rotating the drive member 52 in the first direction 88 with the first drive torque 90 when the stopping device 66*a* is in the second state 100, the drive member 52 is stopped in the neutral position 82 and the driven member 28 is consequently stopped in the open position 34. The arrangement 36*a* thus enables the driven member 28 to be rotated continuously in both clockwise and counterclockwise directions without needing a sensor for determining when the driven member 28 is in the open position 34.

As can be gathered from FIGS. 4*a* and 4*f*, the recess 80 is wide enough such that the ball 68 can be held in the recess 80 and pushed against the stopping spring 70 in the neutral position 82 in each of the first and second states 86 and 100 of the stopping device 66*a*.

Figure 4G:
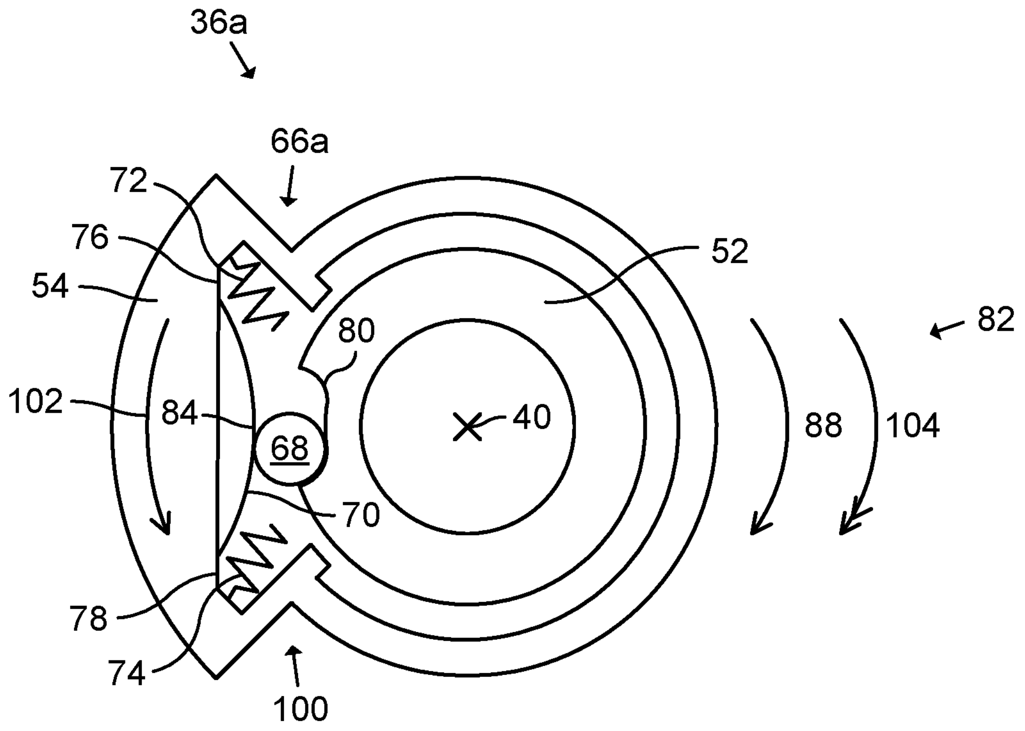
FIG. 4*g*: schematically represents a top view of the arrangement in FIGS. 4*a*-4*f* when the drive member is in the neutral position and a first switching torque is applied to the drive member.

FIG. 4*g* schematically represents a top view of the arrangement 36*a*. In FIG. 4*g*, the drive member 52 is in the neutral position 82. A first switching torque 104 is now applied to the drive member 52 in the first direction 88. The first switching torque 104 may be applied by pushing the state selection element 22. The first switching torque 104 may be applied by pushing the state selection element 22. The first switching torque 104 is larger than the first drive torque 90. The first switching torque 104 will thereby cause the drive member 52 to push the ball 68 by means of the recess 80 against the stopping spring 70 such that the stopping spring 70 becomes enough deformed to cause the ball 68 to be pushed from the second side of the stopping spring 70, through the constriction 84 and back to the first side of the stopping spring 70. The stopping device 66*a* thereby switches from the second state 100 back to the first state 86.

The level of the first switching torque 104 when the ball 68 flips sides is stored as a first threshold value. The first and second threshold values are then used for controlling subsequent switches between the first and second states 86 and 100 of the stopping device 66*a*. By updating the first and second switching torques 104 and 98, the arrangement 36*a* can be regularly calibrated.

Figure 5:
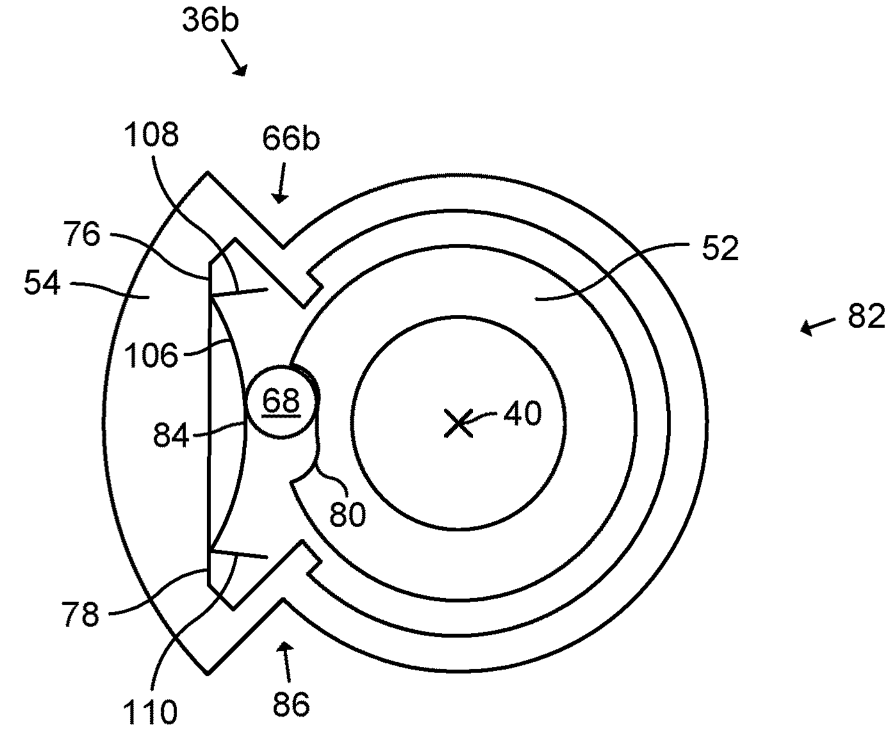
FIG. 5: schematically represents a top view of a further example of the arrangement when a further example of the stopping device is in a first state and the drive member is in a neutral position.

FIG. 5 schematically represents a top view of a further example of an arrangement 36*b*. The arrangement 36*b* has the same functionality as the arrangement 36*a* and may be used as the arrangement 36 in the power tool 10. The arrangement 36*b* comprises a further example of a stopping device 66*b*.

The stopping device 66*b* is in the first state 86. The drive member 52 is in the neutral position 82. Mainly differences with respect to the stopping device 66*a* will be described.

The stopping device 66*b* of this example comprises a blade spring 106. The blade spring 106 is a further example of a limiting element according to the present disclosure. The blade spring 106 is also a further example of an elastic element according to the present disclosure. The blade spring 106 comprises a first leg 108 and a second leg 110. The first and second legs 108 and 110 are further examples of first and second force devices according to the present disclosure. The first leg 108 is positioned in the first chamber 76 and the second leg 110 is positioned in the second chamber 78.

Figure 6:
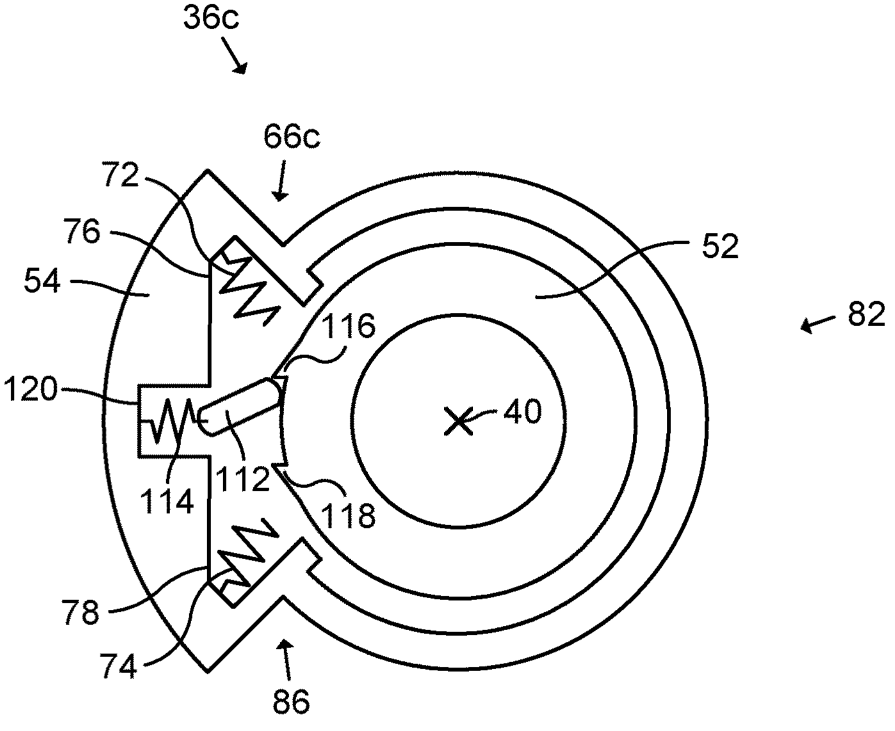
FIG. 6: schematically represents a top view of a further example of the arrangement when a further example of the stopping device is in a first state and the drive member is in a neutral position.

FIG. 6 schematically represents a top view of a further example of an arrangement 36*c*. The arrangement 36*c* has the same functionality as the arrangement 36*a* and may be used as the arrangement 36 in the power tool 10. The arrangement 36*c* comprises a further example of a stopping device 66*c*. The stopping device 66*c* is in the first state 86. The drive member 52 is in the neutral position 82. Mainly differences with respect to the stopping device 66*a* will be described.

Instead of a ball, the stopping device 66*c* comprises a rod 112. The rod 112 is a further example of a movable element according to the present disclosure.

The stopping device 66*c* further comprises a stopping spring 114. The stopping spring 114 is a further example of a limiting element according to the present disclosure. The stopping spring 114 is also a further example of an elastic element according to the present disclosure. The stopping spring 114 enters a cavity 120 of the base structure 54.

One end of the stopping spring 114 is connected to the base structure 54 and the other end of the stopping spring 114 is connected to the rod 112. The stopping spring 114 of this example is a compression coil spring. The stopping device 66*c* of this example does not comprise a constriction.

Furthermore, instead of a recess, the drive member 52 in this example comprises a first wedge 116 and a second wedge 118. The first and second wedges 116 and 118 are protrusions that constitute a further example of an engaging structure according to the present disclosure.

In the first state 86 and the neutral position 82, the first wedge 116 engages the rod 112. If the drive member 52 is rotated in the first direction 88, the stopping spring 114 will push the rod 112 further out from the cavity 120 and the rod 112 will come into contact with the first spring 72. Each time the first and second wedges 116 and 118 pass by the rod 112, the rod 112 will be pushed against the first spring 72.

When the drive member 52 is rotated in the second direction 92, the first wedge 116 will eventually engage the rod 112 and push the rod 112 back to the position shown in FIG. 6 where the drive member 52 is in the neutral position 82. If the second switching torque 98 is applied to the drive member 52, the first wedge 116 will push the rod 112 further into the cavity 120 against further compression of the stopping spring 114 until the rod 112 flips sides.

Figure 7:
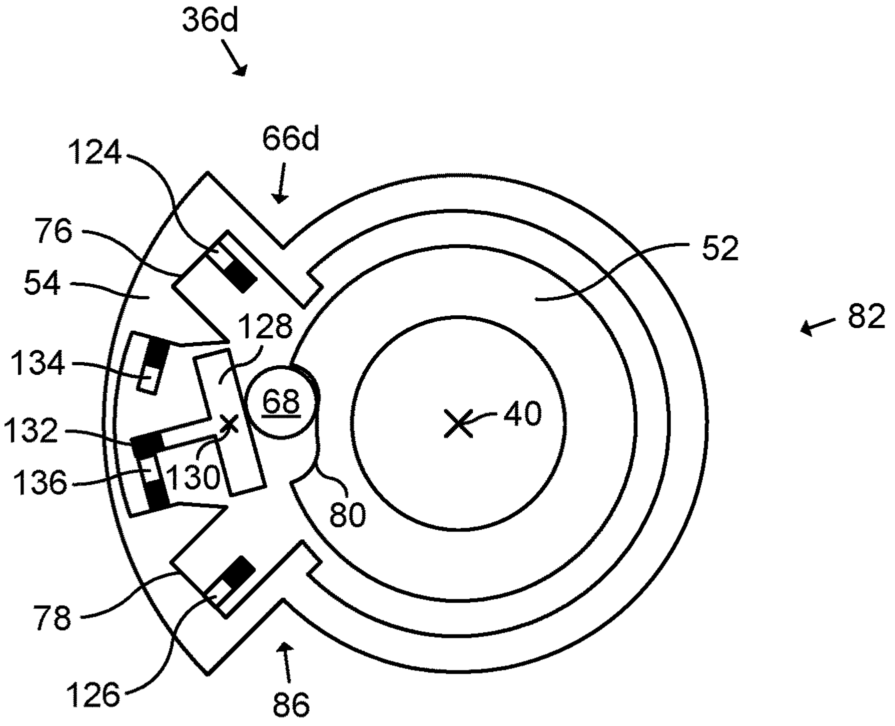
FIG. 7: schematically represents a top view of a further example of the arrangement when a further example of the stopping device is in a first state and the drive member is in a neutral position.

FIG. 7 schematically represents a top view of a further example of an arrangement 36*d*. The arrangement 36*d* has the same functionality as the arrangement 36*a* and may be used as the arrangement 36 in the power tool 10. The arrangement 36*d* comprises a further example of a stopping device 66*d*. The stopping device 66*d* is in the first state 86. The drive member 52 is in the neutral position 82. Mainly differences with respect to the stopping device 66*a* will be described.

The stopping device 66*d* of this example comprises a first magnet 124 and a second magnet 126. The first and second magnets 124 and 126 are further examples of force devices according to the present disclosure. The first magnet 124 is housed in the first chamber 76 and the second magnet 126 is housed in the second chamber 78. Each of the first and second magnets 124 and 126 is configured to generate a repulsive magnetic force on the ball 68 to thereby force the ball 68 towards the drive member 52.

The stopping device 66*d* of this example further comprises a flipping member 128. The flipping member 128 is a further example of a limiting element according to the present disclosure. The flipping member 128 is here T-shaped. The flipping member 128 is rotatable about a flipping axis 130. The flipping member 128 comprises a magnetic target section 132, here at the bottom of the T-shape.

The stopping device 66*d* of this example further comprises a first flipping magnet 134 and a second flipping magnet 136. The target section 132 is arranged between the first and second flipping magnets 134 and 136 in each of the first state 86 and the second state 100 of the stopping device 66*d*. Each of the first and second flipping magnets 134 and 136 is configured to generate an attractive magnetic force on the target section 132.

By applying the second drive torque 94 to the drive member 52 in the neutral position 82 when the stopping device 66*d* adopts the first state 86, the drive member 52 pushes the ball 68 against the flipping member 128. A rotational torque about the flipping axis 130 (clockwise in FIG. 7) is thereby generated. However, this rotational torque is counteracted by the attraction of the target section 132 by the second flipping magnet 136. When the second drive torque 94 is increased to provide the second switching torque 98, the attractive force between the target section 132 and the second flipping magnet 136 is overcome and the flipping member 128 is caused to rotate about the flipping axis 130 (in a clockwise direction in FIG. 7) until the target section 132 is magnetically attracted to the first flipping magnet 134. The ball 68 is then allowed to pass from the first region to the second region. In this way, the stopping device 66*d* can switch from the first state 86 to the second state 100 (and vice versa) by deflection of the flipping member 128.

Figure 8:
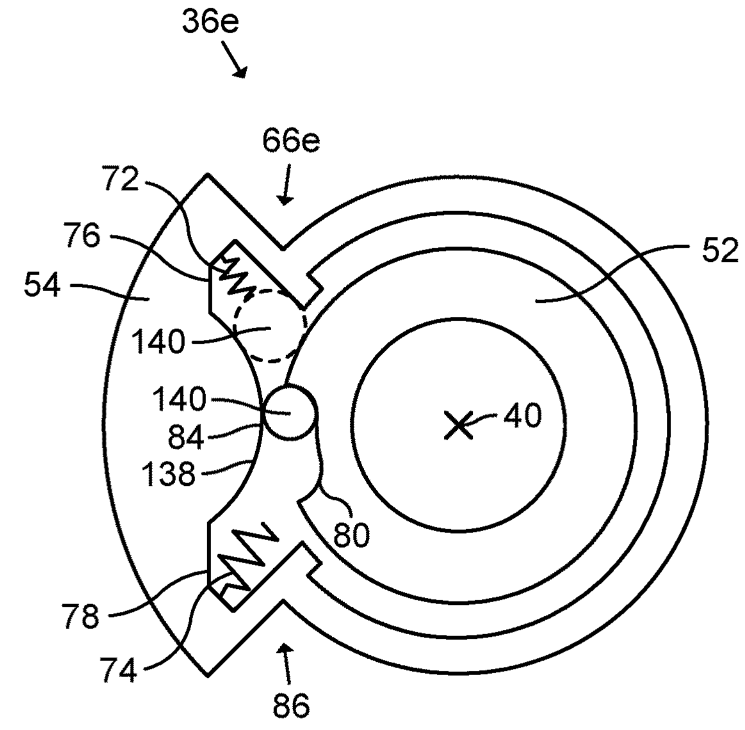
FIG. 8: schematically represents a top view of a further example of the arrangement when a further example of the stopping device is in a first state and the drive member is in a neutral position.

FIG. 8 schematically represents a top view of a further example of an arrangement 36*e*. The arrangement 36*e* has the same functionality as the arrangement 36*a* and may be used as the arrangement 36 in the power tool 10. The arrangement 36*e* comprises a further example of a stopping device 66*e*. The stopping device 66*e* is in the first state 86. Mainly differences with respect to the stopping device 66*a* will be described.

Instead of the stopping spring 70 (see FIGS. 4*a*-4*g*), a rigid bulge 138 protrudes from the base structure 54 towards the drive member 52. The bulge 138 is a further example of a limiting element according to the present disclosure.

Furthermore, instead of the rigid ball 68, the stopping device 66*e* comprises an elastic ball 140. The ball 140 is a further example of a movable element according to the present disclosure. The ball 140 is also a further example of an elastic element according to the present disclosure. FIG. 8 shows the ball 140 in an undeformed state (with a dashed circle) and the ball 140 in a compressed state (with a solid circle).

When the second switching torque 98 is provided to the drive member 52, the ball 140 is squeezed to compress between the recess 80 and the bulge 138.

When the ball 140 is compressed, the ball 140 can pass through the constriction 84. In this way, the stopping device 66*e* can switch from the first state 86 to the second state 100 (and vice versa).

The elastic ball 140 may replace the rigid ball 68 in any of the arrangements 36*a*-36*d*. Thus, the stopping device 66*a*-66*d* may comprise more than one elastic element.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. An arrangement for a power tool, the arrangement comprising:

a base structure;

a drive member rotatable relative to the base structure in a first direction and in a second direction from a neutral position; and a stopping device comprising a movable element and a limiting element, wherein the stopping device is arranged to adopt a first state where the movable element is in a first region with respect to the limiting element, and where the stopping device allows full rotation of the drive member in the first direction and generates a first counter torque against rotation of the drive member in the second direction from the neutral position, wherein the stopping device is arranged to adopt a second state where the movable element is in a second region with respect to the limiting element, and where the stopping device allows full rotation of the drive member in the second direction and provides a second counter torque against rotation of the drive member in the first direction from the neutral position, and wherein the stopping device is deflectable to switch from the first state to the second state by rotating the drive member in the second direction from the neutral position with a second switching torque overcoming the first counter torque.

2. The arrangement according to claim 1, further comprising a constriction between the limiting element and the drive member, wherein the movable element is positioned on a first side of the constriction in the first state and on a second side of the constriction in the second state.

3. The arrangement according to claim 1, wherein the stopping device comprises at least one elastic element, and wherein the stopping device is configured to deflect by deformation of the at least one elastic element when the stopping device switches from the first state to the second state.

4. The arrangement according to claim 1, wherein the base structure comprises a first chamber for receiving the movable element in the first state and a second chamber for receiving the movable element in the second state, and wherein the limiting element is arranged between the first chamber and the second chamber.

5. The arrangement according to claim 4, wherein the stopping device comprises a first force device associated with the first chamber and arranged to force the movable element towards the drive member in the first state, and a second force device associated with the second chamber and arranged to force the movable element towards the drive member in the second state.

6. The arrangement according to claim 1, wherein the drive member comprises an engaging structure arranged to engage the movable element in the neutral position in each of the first state and the second state.

7. The arrangement according to claim 6, wherein the engaging structure comprises a recess.

8. The arrangement according to claim 1, wherein the movable element comprises a ball.

9. A tool head for a power tool, the tool head comprising the arrangement according to claim 1.

10. The tool head according to claim 9, further comprising:

a driven axis;

a base element having a base opening;

a driven member having a driven member opening, the driven member being rotatable about the driven axis from an open position where the driven member opening is aligned with the base opening; and a drive transmission arranged to transmit a rotation of the drive member to a rotation of the driven member, wherein the drive transmission is configured such that the neutral position of the drive member corresponds to the open position of the driven member.

11. A power tool comprising the tool head according to claim 9.

12. The power tool according to claim 11, further comprising a control system, the control system comprising at least one data processing device and at least one memory comprising non-transitory computer-readable medium having at least one computer program stored thereon, the at least one computer program comprising program code which, when executed by the at least one data processing device, causes the at least one data processing device to perform:

causing the drive member to generate a second drive torque in the second direction against the stopping device in the neutral position of the drive member when the stopping device adopts the first state;

causing the second drive torque to increase to a second switching torque where the stopping device switches from the first state to the second state; and storing a second threshold value indicative of the second switching torque.

13. The power tool according to claim 11, further comprising:

a state selection element for alternatingly selecting between the first state and the second state; and a driving command element for alternatingly causing rotation of the drive member in the first direction and in the second direction.

14. A method of controlling an arrangement for a power tool, where the arrangement comprises:

a base structure;

a drive member rotatable relative to the base structure in a first direction and in a second direction from a neutral position;

a stopping device comprising a movable element and a limiting element, wherein the stopping device is arranged to adopt a first state where the movable element is in a first region with respect to the limiting element, and where the stopping device allows full rotation of the drive member in the first direction and generates a first counter torque against rotation of the drive member in the second direction from the neutral position, wherein the stopping device is arranged to adopt a second state where the movable element is in a second region with respect to the limiting element, and where the stopping device allows full rotation of the drive member in the second direction and provides a second counter torque against rotation of the drive member in the first direction from the neutral position, and wherein the stopping device is deflectable to switch from the first state to the second state by rotating the drive member in the second direction from the neutral position with a second switching torque overcoming the first counter torque, the method comprising:

causing the drive member to generate a second drive torque in the second direction against the stopping device in the neutral position of the drive member when the stopping device adopts the first state;

causing the second drive torque to increase to the second switching torque where the stopping device switches from the first state to the second state; and storing a second threshold value indicative of the second switching torque.

15. An arrangement for a power tool, the arrangement comprising:

a base structure;

a drive member rotatable relative to the base structure in a first direction and in a second direction from a neutral position; and a stopping device comprising a movable element and a limiting element, wherein the stopping device is arranged to adopt a first state where the movable element is in a first region with respect to the limiting element, and where the stopping device allows rotation of the drive member in the first direction and generates a first counter torque against rotation of the drive member in the second direction from the neutral position, wherein the stopping device is arranged to adopt a second state where the movable element is in a second region with respect to the limiting element, and where the stopping device allows rotation of the drive member in the second direction and provides a second counter torque against rotation of the drive member in the first direction from the neutral position, wherein the stopping device is deflectable to switch from the first state to the second state by rotating the drive member in the second direction from the neutral position with a second switching torque overcoming the first counter torque, wherein the base structure comprises a first chamber for receiving the movable element in the first state and a second chamber for receiving the movable element in the second state, and wherein the limiting element is arranged between the first chamber and the second chamber, and wherein the stopping device comprises a first force device associated with the first chamber and arranged to force the movable element towards the drive member in the first state, and a second force device associated with the second chamber and arranged to force the movable element towards the drive member in the second state.

16. A tool head for a power tool, the tool head comprising:

an arrangement comprising:

a base structure;

a drive member rotatable relative to the base structure in a first direction and in a second direction from a neutral position; and a stopping device comprising a movable element and a limiting element, wherein the stopping device is arranged to adopt a first state where the movable element is in a first region with respect to the limiting element, and where the stopping device allows rotation of the drive member in the first direction and generates a first counter torque against rotation of the drive member in the second direction from the neutral position, wherein the stopping device is arranged to adopt a second state where the movable element is in a second region with respect to the limiting element, and where the stopping device allows rotation of the drive member in the second direction and provides a second counter torque against rotation of the drive member in the first direction from the neutral position, and wherein the stopping device is deflectable to switch from the first state to the second state by rotating the drive member in the second direction from the neutral position with a second switching torque overcoming the first counter torque, a driven axis;

a base element having a base opening;

a driven member having a driven member opening, the driven member being rotatable about the driven axis from an open position where the driven member opening is aligned with the base opening; and a drive transmission arranged to transmit a rotation of the drive member to a rotation of the driven member, wherein the drive transmission is configured such that the neutral position of the drive member corresponds to the open position of the driven member.

* * * * *